United States Patent Office 3,848,042
Patented Nov. 12, 1974

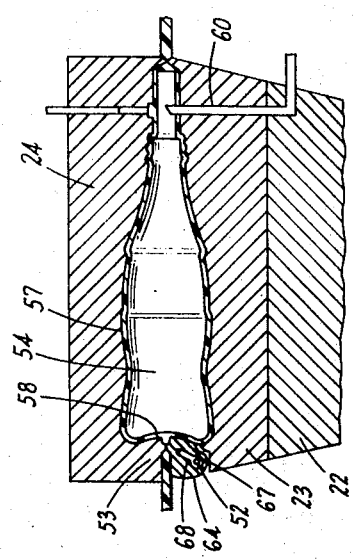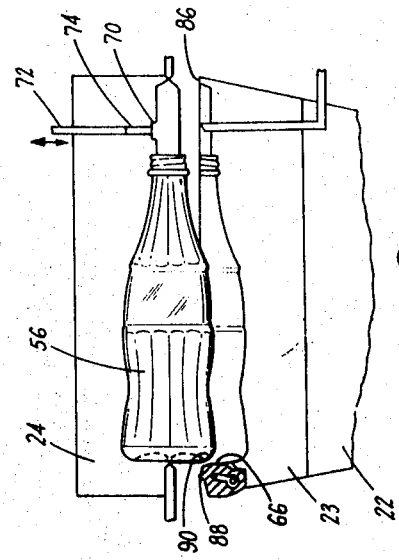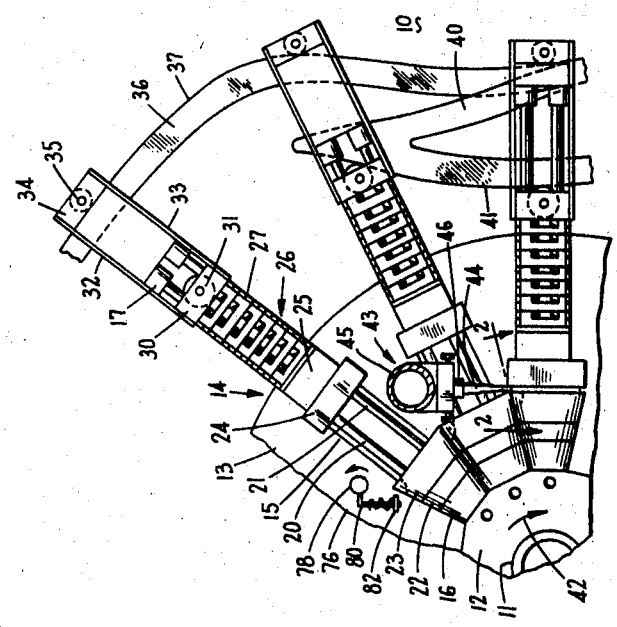

3,848,042
METHOD FOR BLOW MOLDING CONTAINERS HAVING RAISED BOTTOM WALL PORTIONS
Richard K. Shelby, Chicago, Ill., assignor to Monsanto Company, St. Louis, Mo.
Original application Dec. 30, 1970, Ser. No. 102,783, now Patent No. 3,718,416, dated Feb. 27, 1973. Divided and this application June 14, 1972, Ser. No. 262,750
Int. Cl. B29c 7/00, 17/07
U.S. Cl. 264—99
2 Claims

ABSTRACT OF THE DISCLOSURE

An improved method for releasing blown containers having raised bottom wall portions from the mold, wherein a part of the molding surface defining the raised bottom wall is mounted, preferably by means of a pivotable insert in one of the mold sections, for movement away from the mold chamber during mold opening. An undercut portion in another of the mold sections cooperates with a portion of the plastic to hold the blown parison in that mold section during opening so that the chime section on the formed container is responsible for camming the insert away from the mold chamber. The mold assembly is preferably mounted for movement along a circular path in a vertical plane with the sections moving perpendicular to the axis of the path, the pivotable mold insert thereby returning to container forming position, preferably automatically under the influence of gravity, after release of an article as the mold moves downwardly in traversing the circular path.

This is a division of application Serial No. 102,783, filed Dec. 30, 1970, now Pat. No. 3,718,416, dated Feb. 27, 1973.

BRIEF DESCRIPTION OF THE DRAWINGS

This invention relates to blown molding and more particularly to releasing blown containers having raised bottom wall portions from the mold.

Thermoplastic containers for holding pressurized materials such as carbonated beverages, beer, aerosols and the like have been appearing recently in the marketplace. To effectively hold the pressures of such materials without utilizing an excessive amount of thermoplastic in the article, the container should be shaped to minimize stress buildup, especially in the bottom area. As is known, a base configuration which smoothly projects upwardly to a limited extent into the body of the container is effective in minimizing areas of high stress concentration in the base. When containers having such configurations are formed by the well known method of expanding a tubular preform within closed sections of a partible blow mold, a problem occurs in freeing the container from the mold. This is so because the portion of the mold surface defining the raised bottom wall acts as an undercut with respect to the chime area at the junction of the sidewall with the base, and when the chime area moves across the raised mold surface portion on separating the sections, the container is often crushed along the chime. The problem is especially acute when the thermoplastic is one of the recently developed varieties which are especially applicable for holding such pressurized materials, but which are somewhat brittle and rigid and not susceptible to much deformation during mold opening to permit movement of the chime area across the raised mold surface portion.

Considering now the various types of high volume blow molding systems utilized in forming containers in general, a series of molds are usually mounted on a support for movement in a circular path in either a horizontal or vertical plane with each mold accepting a portion of a parison issuing from an extrusion head mounted adjacent the path. Though both systems, i.e. movement in a horizontal or in a vertical plane, have been used extensively, movement in a vertical plane has certain advantages. More specifically, continuous extrusion rather than intermittent has been successfully demonstrated with mold movement in a vertical plane, and consequently inertia forces generated with stop and start movement are eliminated. Downward or upward extrusion in a vertical plane at the periphery of the circular path is along the direction of mold movement and consequently gravity effects on the parison are minimized during mold closing. When movement of the mold sections during opening and closing is perpendicular to the axis of the vertically oriented circular path, as is illustrated in U.S. Pat. No. 2,784,452, a portion of the extruding parison is effectively laid on the inner mold half and held there at one end by the inner mold half and by the extrusion nozzle at the other end just prior to mold closing. With this particular approach, the parison may be consistently centered in the mold, which, of course, results in consistent production of high quality articles.

Heretofore, however, as far as is known, it has not been possible to manufacture containers of the aforementioned variety on this type of just described equipment.

SUMMARY OF THE INVENTION

Now, however, there has been developed an improved method for manufacturing containers having raised bottom wall portions which overcomes the aforementioned problems encountered with prior art techniques Accordingly, a principal object of this invention is to provide an improved method for blow molding containers having raised bottom wall portions.

Another object of this invention is to provide an extremely simple method for releasing containers of the aforementioned variety from the mold, which is useful in any of the conventional types of blow molding systems.

A further object of this invention is to provide an improved method for forming containers of the aforementioned variety which is particularly suitable for use in a rotary blow molding system operating in a vertical plane wherein the molds move toward and away from the axis of rotation on opening and closing.

An additional object of this invention is to provide an improved method for use in the aforementioned specific type of blow molding system for accommodating containers having raised bottom walls wherein only a minimum amount of equipment revision is required.

Other objects of this invention will in part be obvious and will in part appear hereinafter.

These and other objects are accomplished in a blow mold assembly comprising partible sections defining the surface of a mold chamber conforming to the shape of a container having a raised bottom wall, by providing the improvement wherein at least a portion of the surface of the chamber defining the raised bottom wall is mounted for movement away from the chamber along the axis thereof as the mold sections part to facilitate removal of the container from the mold after forming. The movably mounted surface preferably is a part of an insert pivotally connected to one of the mold sections. The mold is preferably mounted for movement through a circular path in a vertical plane, the insert preferably being configured such that it moves about its pivot point into container forming postiion under the influence of gravity when the mold moves downwardly in traversing the path.

The improved process comprises forcing at least a portion of the chamber surface defining the raised bottom of the container in a direction away from the chamber by means of the container itself during mold opening to facilitate moving the peripheral portion of the container bottom past the portion of the chamber surface defining the raised container bottom.

BRIEF DESCRIPTION OF THE DRAWINGS

In describing the overall invention, reference will be made to the accompanying drawing wherein:

FIG. 1 is a fragmentary, elevational view of a portion of a blow molding machine showing mold sections incorporating the improvements of the present invention;

FIG. 2 is an enlarged, fragmentary elevational view, partly in section, of the improved mold construction of the invention taken along the line 2—2 of FIG. 1 and rotated 90 degrees counterclockwise therefrom; and FIG. 3 is a schematic view illustrating the manner in which the container is ejected from the mold of FIG. 2.

DETAILED DESCRIPTION OF THE PREFERRED EMBODIMENTS

Referring now to the drawings, with reference to FIG. 1, the blow molding machine, of which only a portion is illustrated, is referred to generally by the numeral 10. The entire assembly comprising blow molding machine 10 is shown more completely in U.S. Pat. No. 2,784,452. Blow molding machine 10 includes a horizontally extending, hollow, rotatable main shaft 11 which is caused to rotate continuously in a clockwise direction in a vertical plane by means of a drive unit which is not illustrated. Affixed to the saft 11 for rotation therewith is a hub 12. Fixedly attached to hub 12 is a circular mold supporting plate 13.

A plurality of identical mold units generally indicated by the numeral 14, only one of which will be described hereafter in detail, are equally spaced about the periphery of hub 12 and extend radially outwardly therefrom in a common plane normal to the axis of shaft 11 in a manner similar to the spokes of a wagon wheel. Each of the mold units 14 includes an arm base plate 15 which is fixedly mounted on the mold supporting plate 13. The arm base plate 15 includes an inner arm end 16 and an outer arm end 17 which extend outwardly from the base plate normal thereto. A pair of round, parallel rods indicated at 20 and 21 extend between the inner and outer arm ends and have their terminal end portions securely held in inner and outer arm ends 16 and 17. Attached to the inner arm end 16 is an inner mold holding block 22, and an inner fixed mold half 23 is in turn removably secured to the inner mold holding block 22 in a conventional manner.

An outer movable mold half 24 is likewise secured to an outer mold holding block 25. The outer mold holding block 25 is slidably mounted on rods 20 and 21 to effect opening and closing of mold half 24 of each mold unit 14. The outer mold holding block 25 is a part of a slidable mold positioning assembly generally indicated by the numeral 26. Mold positioning assembly 26 includes a plurality of spacer blocks, typically depicted as 27, which are clamped between an actuator block 30 and the outer mold holding block 25 so as to space these blocks apart a desired amount. Actuator block 30 has a mold closing roller 31 rotatably journaled therein. Fixedly attached to the sides of actuator block 30 is a pair of straps 32 and 33 which are employed to support a roller block 34 therebetween. Suitably journaled on roller block 34 is a mold opening roller 35. Mold opening roller 35 cooperates with a fixed mold opening cam 36 having a mold opening cam surface 37 employed to cause the slidable mold positioning assembly 26 to slide outwardly on the rods 20 and 21 away from shaft 11 as shaft 11 rotates so as to separate outer mold half 24 from inner half 23.

A second fixed cam 40 having a mold closing cam surface 41 is employed to cooperate with the mold closing roller 31 of sliable mold positioning assembly 26 to effect the movement of the mold positioning assembly radially inwardly along the rods 20 and 21 so as to effect the closing of outer mold half 24 on inner mold half 23.

It is to be understood that mold units 14 will be sequentially opened and closed by the respective cams 36 and 40 as they revolve in a clockwise direction, indicated by the directional arrow 42, about the axis of shaft 11 as a result of the rotation imparted to shaft 11 by the drive means. The portion of the blow molding machine 10 illustrated in FIG. 1 includes the mold charging station generally indicated at 43. At this station the mold units are charged with portions of plastic tubing or parison 44 which is being continuously downwardly extruded from a plastic extrusion device of conventional design indicated generally by the numeral 45. Plastic extrusion device 45 includes an extrusion die assembly or head indicated generally at 46 which fits between open mold halves 23 and 24 at the charging station just before the mold halves close and clamp off a portion of plastic tubing 44 therebetween. As the charged and closed mold halves 23 and 24 move around the axis of shaft 11 in a circular path, the portion of the plastic tube or parison clamped therebetween will be pierced by a hollow needle 60 (FIG. 2) and a pressurized fluid such as compressed air will be delivered through the needle into the clamped off tube portion to inflate it into conformity with the shape of mold chamber 54 (FIG. 2) defined between closed mold halves 23 and 24. Mold halves 23 and 24 are cooled by means of cooling water circulated therein so as to set the plastic article being molded by the time the mold halves are opened for removal of the blow molded article at an article discharge station at a point in the circular path of travel of a mold unit 14 above shaft 11. Before the mold halves are opened, of course, the inflating needle should be retracted, for example by means of a conventional air cylinder, and the superatmospheric pressure in the molded article released.

In FIG. 2, there is illustrated the improved mold additions particularly suitable for use with the form of basic blow molding machine 10 just described. Each mold comprising partible sections 23 and 24 define chamber 54 in the closed position, the surface of which conforms to the exterior of container or bottle 56, having raised bottom wall 58, which protrudes smoothly inwardly into the body of container 56 from the periphery of the lower end of its sidewall 57. Each mold section 23 closest to the axis of rotation of the machine, or in other words the inner mold section, includes an insert portion 64 pivotally mounted by means of pin 52, in the base of section 23. Insert 64 has a surface portion 66 which defines ½ of raised bottom wall 58 of container 56, and a compression edge 88 for cooperation with an opposing compression edge in mold section 24. Insert 64 is cored, for example at 68, for circulation of a conventional heat transfer medium, such as cooling water, therethrough to set the thermoplastic after expansion against surface 66. Mold section 24, or in other words the outer section furthest away from shaft 11, has an undercut portion 70 formed in a surface thereof, preferably adjacent its upper end, which cooperates, as illustrated in FIG. 3, with a portion of the thermoplastic parison 44 in order to grip the parison above the section defining the formed container 56 to insure that container 56 stays in mold section 24 as it moves away from shaft 11 on mold opening.

Each container 56 is ejected from an outer mold half 24 after the plastic has at least partially set, for example, by forcing reciprocably mounted knock-out pin 72, which is slidable within chamber 74, against the plastic spanning the opening at the inner end of chamber 74 and held there as a result of undercut 70. Prior to closing around the next parison portion, insert 64 will pivot about pin 52 under the influence of its own weight from a container release position, to be described hereafter in more detail, to a container forming position, the latter occurring when insert 64 is aligned opposite fixed portion 53 of mold section 24. However, to insure that insert 64 is always accurately repositioned after release of a container, means, such as schematically depicted at 76, attached to plate 13 in FIG. 1, may be provided, for positively moving insert 64 from a container release position to a container forming position at a preselected point along the circular path, e.g. between 12 and 1:30 o'clock when looking at FIG. 1. These means 76 may include shaft 78 rotating in the opposite direction from the main shaft 11 of the blow molding assembly, and at a speed equivalent or proportional to the rotary speed of shaft 11. Arm 80 connected to shaft 78 serves to support one or more pressure feet 82 which are spring loaded on arm 80 by means of spring 84.

In operation, as each mold, which comprises the combination of halves 23 and 24 moves downwardly under extrusion head 46, outer mold half 24 is automatically caused to move toward inner mold half 23 as a result of mold closing roller 31 and the contour of cam 40, so as to enclose a portion of continuously extruding parison 44 between the sections of the blow mold. As the outer mold half 24 closes on the inner half, the parison portion is compressed between opposing upper and lower compression edges, those on section 23 being indicated at 86 and 88 respectively (FIG. 3). After each parison portion is expanded and the thermoplastic has set by contact with cooled surfaces of the mold, each mold is opened by means of the cooperation between mold opening roller 35 and mold opening cam 36 as heretofore described. This mold opening usually occurs at between 10 and 11 o'clock when considered with respect to FIG. 1. As each outer mold section 24 moves away from an inner section, container 56 will remain attached to mold section 24 because of mold undercut portion 70. As this separation of section 24 occurs, chamber surface portion 66 of mold insert 64 will be forced away from chamber 54 in a direction radial with respect to pin 52, by means of the raised bottom wall 58 of container 56 so as to move to a container release position, thereby facilitating moving the peripheral or chime portion 90 of the container beyond chamber surface portion 66 which defines bottom 58 of container 56. The extent of this movement of insert 66 is slight, need not exceed the amount taken in axial direction which bottom 58 protrudes into the container, and preferably is between 10 to 100 percent of this amount. Movement of insert 64 is terminated when it abuts against surface 67 of section 23. As is also apparent, portion 53, a surface of which defines the other half of container bottom wall 58, remains fixed with respect to mold half 24 during separation of the particle section. After the mold sections are thus parted, container 56 is ejected from mold half 24 by means of reciprocating pin 72 acting against the flash portion adjacent the upper end of the container, so as to knock the flash and the integrally attached container away from section 24, preferably into a suitable article collection system. During such removal, the upper end of the expanded parison 44 is acted on by pin 72 to intially move the upper end portion away from section 24, whereupon the lower portion which includes the raised bottom is then free to fall away from section 24.

As each mold further traverses the circular path back toward extrusion head 46 to pick up the next section of parison 44 to form the next successive container, shaft 78 of insert moving means 76 is so synchronized such that when each mold section 23 having pivotally mounted insert 64 therein is passing means 76, spring mounted pressure foot 82 gently kisses the outer surface of insert 64 so as to move insert 64 and thereby surface 66 back into its container forming position such that it is ready to be held in place against the pressure generated in the next successive forming cycle along compression surface 88. As has been mentioned previously, means 76 may not be necessary when insert 64 is designed such that it moves back into container forming position under the influence of gravity during downward movement of each mold in traversing its circular path of travel.

Through the improved mold release technique of the present invention has been illustrated in the preferable blow molding assembly operable in a vertical plane, it should be understood that it is equally applicable in systems operating in a horizontal or in any intermediate plane.

Though the technique of the present invention is useful with all types of conventional moldable thermoplastics, it is especially useful with brittle, relatively non-pliant thermoplastics which cannot be compressed sufficiently to allow release of a container having a raised bottom during mold opening. Such thermoplastics typically include those in which a major proportion (in excess of 50 weight percent) of the polymer has been polymerized from a monomer having one or more nitrile groups in its molecular structure. Typical of these latter materials are polymers of methacrylonitrile.

The above descripton and particularly the drawngs are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a blow molding process for forming a container having a raised bottom wall by expanding a thermoplastic parison against the surface of a chamber defined by portions of partible blow mold sections when in closed position, and then moving at least a portion of the chamber surface defining the raised bottom wall away from the chamber to facilitate removing the container from the chamber, the improvement which comprises moving said sections toward and away from each other perpendicular to the axis of a circular path in a vertical plane to close and open such sections as they traverse said path, drawing a portion of the container bottom wall across a movably mounted corresponding portion of the chamber surface which defined said bottom wall portion, during opening of said partible sections to urge said corresponding portion of the chamber surface out of the way of the bottom wall portion as the container is being extracted from the mold section containing said movably mounted chamber surface portion, and then moving said chamber surface portion in the opposite direction under the influence of gravity only to a container-forming position at a predetermined position on said circular path prior to closing said sections.

2. In a blow molding process for forming a container having a raised bottom wall by expanding a thermoplastic parison against the surface of a chamber defined by portions of partible blow mold sections when in closed position, and then moving at least a portion of the chamber surface defining the raised bottom wall away from the chamber to facilitate removing the container from the chamber, the improvement which comprises moving said sections toward and away from each other perpendicular to the axis of a circular path in a vertical plane to close and open such sections as they traverse said path, drawing a portion of the container bottom wall across a portion of the chamber surface which defined said bottom wall portion and which is a part of a movably mounted mold insert, during opening of said partible sections in order to urge said corresponding portion of the chamber surface out of the way of the bottom wall portion as the container is being extracted from the mold section containing said movably mounted mold insert and then gently kissing said insert with a rotating foot at a predetermined point on said circular path prior to closing said sections to move said insert and thereby said chamber surface portion thereof into container-forming position.

References Cited

UNITED STATES PATENTS

| | | | |
|---|---|---|---|
| 3,621,525 | 11/1971 | Butcher | 425—326 B X |
| 3,577,593 | 5/1971 | Jackson | 425—388 |
| 3,357,043 | 12/1967 | Doucet | 264—335 X |
| 2,784,452 | 3/1957 | Ruekberg et al. | 425—451 X |
| 3,541,640 | 11/1970 | Stefaniak et al. | 425—326 X |
| 3,662,049 | 5/1972 | Gilbert | 264—96 X |
| 3,753,641 | 8/1973 | Turner et al. | 425—Dig. 58 |

JAN H. SILBAUGH, Primary Examiner

U.S. Cl. X.R.

264—334